(12) United States Patent
Leyva et al.

(10) Patent No.: US 7,093,794 B2
(45) Date of Patent: Aug. 22, 2006

(54) AIRCRAFT AND DETONATIVE ENGINE INCORPORATING PULSE DETONATION ENGINES

(75) Inventors: Ivett Alejancra Leyva, Niskayuna, NY (US); Anthony John Dean, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 140 days.

(21) Appl. No.: 10/065,815

(22) Filed: Nov. 22, 2002

(65) Prior Publication Data

US 2004/0099764 A1    May 27, 2004

(51) Int. Cl.
    *B64D 27/18*    (2006.01)
(52) U.S. Cl. .......................... 244/54; 60/39.76; 244/62
(58) Field of Classification Search .............. 244/53 R, 244/56, 12.4, 12.5, 62, 66, 74, 54, 64; 60/204, 60/247, 39.76, 39.38
    See application file for complete search history.

(56) References Cited

U.S. PATENT DOCUMENTS

| | | | | |
|---|---|---|---|---|
| 2,514,639 A * | 7/1950 | Haack | ........................ | 244/72 |
| 2,568,021 A * | 9/1951 | Northrop | .................... | 244/207 |
| 2,589,732 A * | 3/1952 | Riviere | ........................ | 244/15 |
| 2,982,495 A * | 5/1961 | Griffith | ....................... | 244/12.4 |
| 3,099,420 A * | 7/1963 | Messerschmitt et al. | ... | 244/12.4 |
| 4,392,621 A * | 7/1983 | Viets | .......................... | 244/12.5 |
| 4,492,353 A * | 1/1985 | Phillips | ..................... | 244/12.4 |
| 4,505,443 A * | 3/1985 | Bradfield et al. | ........... | 244/12.5 |
| 4,969,614 A * | 11/1990 | Capuani | ..................... | 244/12.4 |
| 5,131,605 A * | 7/1992 | Kress | ........................... | 244/56 |
| 5,855,827 A * | 1/1999 | Bussing et al. | ................ | 264/7 |
| 5,896,742 A * | 4/1999 | Black et al. | ............... | 60/39.37 |
| 5,901,550 A * | 5/1999 | Bussing et al. | ............. | 60/39.38 |
| 5,909,475 A * | 6/1999 | Wells et al. | ................ | 376/272 |
| 6,003,301 A | 12/1999 | Bratkovich et al. | | |
| 6,439,503 B1 * | 8/2002 | Winfree et al. | ........... | 244/53 R |
| 6,637,187 B1 * | 10/2003 | Sanders et al. | ................ | 60/247 |

OTHER PUBLICATIONS

U.S. Appl. No. 10/202,533 (121243), Leyva et al., filed Jul. 25, 2002.
U.S. Appl. No. 10/184,240 (125467), Leyva et al., filed Jun. 27, 2002.
Thomas Kaemming, "Integrated Vehicle Comparison of Turbo-Ramjet Engine and Pulsed Detonation Engine (PDE)," ASME Turbo Expo 2001, Jun. 4-7, 2001, New Orleans, Louisiana, 2001-GT-0451.

* cited by examiner

*Primary Examiner*—Peter M. Poon
*Assistant Examiner*—Timothy D. Collins
(74) *Attorney, Agent, or Firm*—Penny A. Clarke; Patrick K. Patnode

(57) ABSTRACT

An aircraft includes at least one airfoil having a leading edge and a trailing edge. A number of pulse detonation engines are distributed along one of the leading and trailing edges of the airfoil and are positioned beneath the airfoil. Each pulse detonation engine is adapted for impulsively detonating a fuel/oxidizer mixture to generate a thrust force and to apply the thrust force to the aircraft. At least one of the pulse detonation engines is movably configured for altering a direction of the thrust force relative to the airfoil.

15 Claims, 8 Drawing Sheets

AIRCRAFT AND DETONATIVE ENGINE INCORPORATING PULSE DETONATION ENGINES

BACKGROUND OF INVENTION

The invention relates generally to the field of generating and controlling thrust for aircrafts and, more particularly, to the use of a number of pulse detonation engines to generate and control thrust.

Conventional aircraft are powered by gas turbine engines, based on the Brayton cycle. Although present-day aircraft engines are highly refined, it would be desirable to develop an alternate or supplemental means for generating and controlling thrust that provides distributed thrust production, thrust modulation (both in direction and magnitude), turn-down capabilities, and system redundancy.

SUMMARY OF INVENTION

Briefly, in accordance with one embodiment of the present invention, an aircraft includes at least one airfoil having a leading edge and a trailing edge. The aircraft further includes a number of pulse detonation engines distributed along one of the leading and trailing edges of the airfoil and positioned beneath the airfoil. Each of the pulse detonation engines is adapted for impulsively detonating a fuel/oxidizer mixture to generate a thrust force and to apply the thrust force to the aircraft. At least one of the pulse detonation engines is movably configured for altering a direction of the thrust force relative to the airfoil.

According to another embodiment, an aircraft includes at least one airfoil having a leading edge and a trailing edge. A number of pulse detonation engines are distributed along the trailing edge of the airfoil and are positioned beneath the airfoil. Each pulse detonation engine is adapted for impulsively detonating a fuel/oxidizer mixture to generate a thrust force and to apply the thrust force to the aircraft. At least one of the pulse detonation engines includes a PDE flap, which is movably configured to alter the direction of the thrust force relative to the airfoil.

According to another embodiment, a detonative engine includes a number of pulse detonation engines arranged in a packed configuration. At least one of the pulse detonation engines is hexagonal, and the pulse detonation engines are packed in a honeycomb arrangement.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
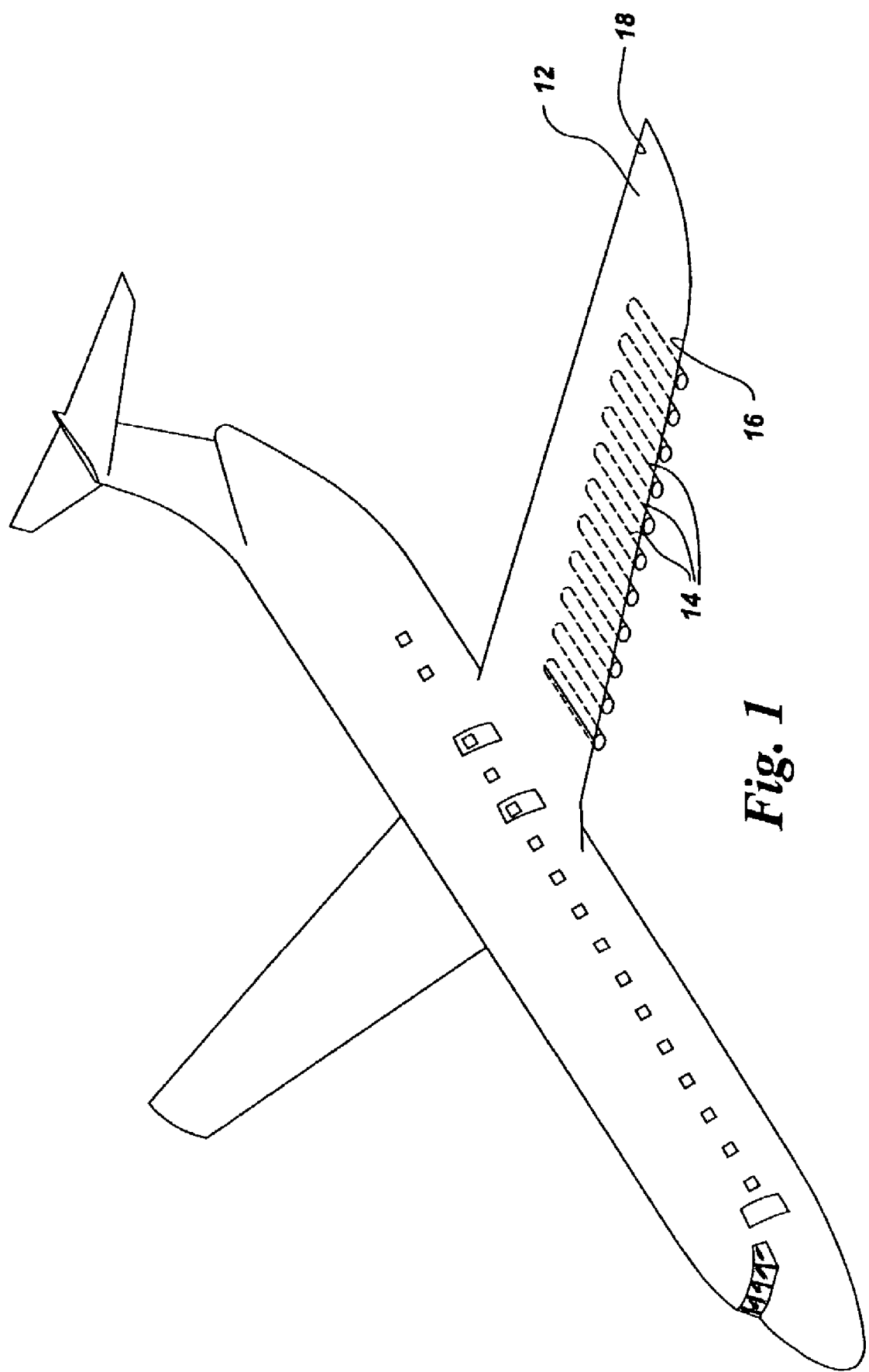
FIG. 1 depicts an aircraft with a number of pulse detonation engines distributed underneath an airfoil, along a leading edge thereof.
Figure 3:
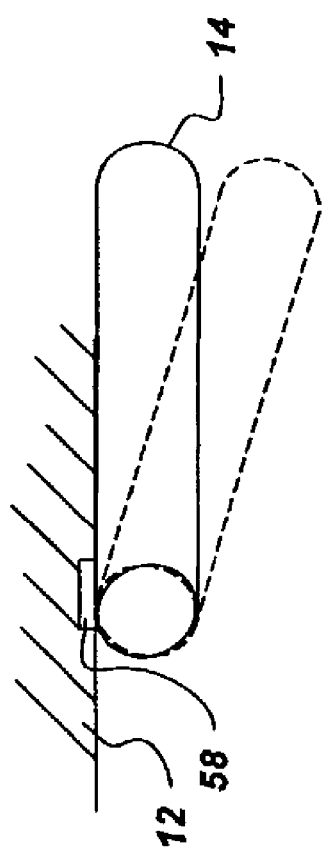
FIG. 3 illustrates a moveably configured pulse detonation engine that is attached below the airfoil of FIG. 1 by at least one hinge.

An aircraft 10 embodiment of the invention is described with reference to FIGS. 1 and 3. As shown in FIG. 1, aircraft 10 includes at least one airfoil 12, with a leading edge 16 and a trailing edge 18, and a number of pulse detonation engines (PDEs) 14 distributed along one of the leading and trailing edges of the airfoil. For the embodiment illustrated in FIG. 1, the airfoils 12 are wings 12. The pulse detonation engines 14 are positioned beneath the airfoil 12, as indicated by dashed lines in FIG. 1, for example. Each of the pulse detonation engines 14 is adapted for impulsively detonating a fuel/oxidizer mixture to generate a thrust force and to apply the thrust force to the aircraft 10. An exemplary oxidizer is air. As shown, for example in FIG. 3, at least one of the pulse detonation engines 14 is movably configured for altering a direction of the thrust force relative to the airfoil 12. According to a more particular embodiment, each of the PDEs 14 is movably configured for altering a direction of the thrust force relative to airfoil 12. As used here, the phrase "altering a direction" encompasses changing the direction of the thrust force horizontally, vertically, or both horizontally and vertically. For example, the PDE 14 is attached to airfoil 12 by one or more hinges 58, as indicated in FIG. 3. Beneficially, movably configured PDEs 14 permit altering the direction of the thrust force relative to airfoil 12, thereby increasing the maneuverability of aircraft 10. In addition, by positioning PDEs 14 beneath airfoil 12, the PDEs 14 are accessible for replacement and other maintenance operations, expediting such operations.

For the particular embodiment shown in FIG. 1, the pulse detonation engines 14 are distributed along the leading edge 16 of airfoil 12.

As used herein, a "pulse detonation engine" is understood to mean any device or system that produces both a pressure rise and velocity increase from a series of repeating detonations or quasi-detonations within the device. A "quasi-detonation" is a combustion process that produces a pressure rise and velocity increase higher than the pressure rise and velocity increase produced by a deflagration wave. Typical embodiments of PDEs include a means of igniting a fuel/ oxidizer mixture, for example a fuel/air mixture, and a detonation chamber, in which pressure wave fronts initiated by the ignition process coalesce to produce a detonation wave. The geometry of the detonation chamber is such that the pressure rise of the detonation wave expels combustion products out the PDE exhaust to produce a thrust force. As used herein, "impulsively detonating" refers to a process of repeating detonations or quasi-detonations, in which each detonation or quasi-detonation is initiated either by external ignition, such as spark discharge or laser pulse, or by gas dynamic processes, such as shock focusing, autoignition or by another detonation (cross-fire).

Figure 2:
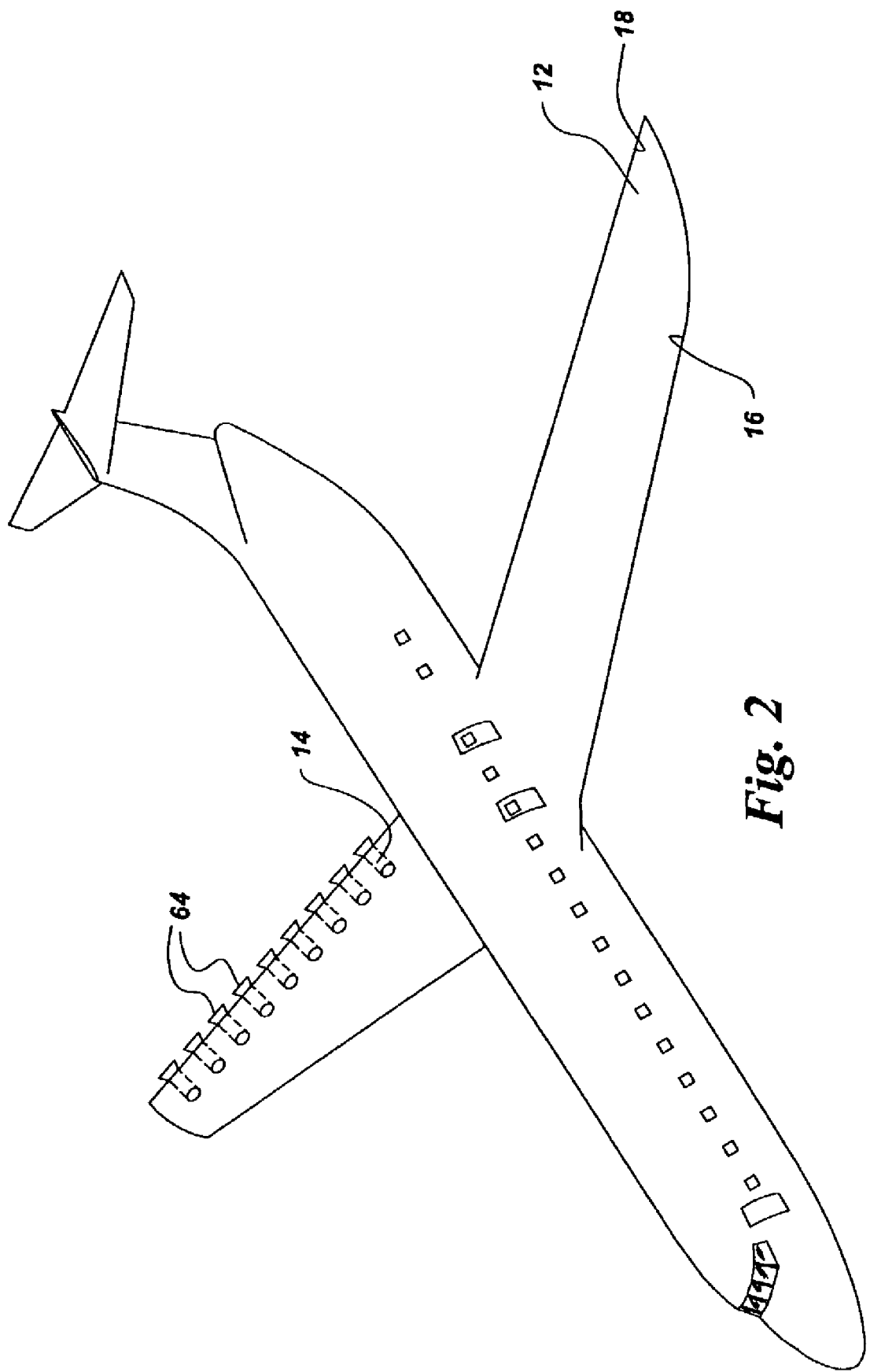
FIG. 2 shows an aircraft with a number of pulse detonation engines distributed underneath the airfoil, along a trailing edge thereof.
Figure 12:
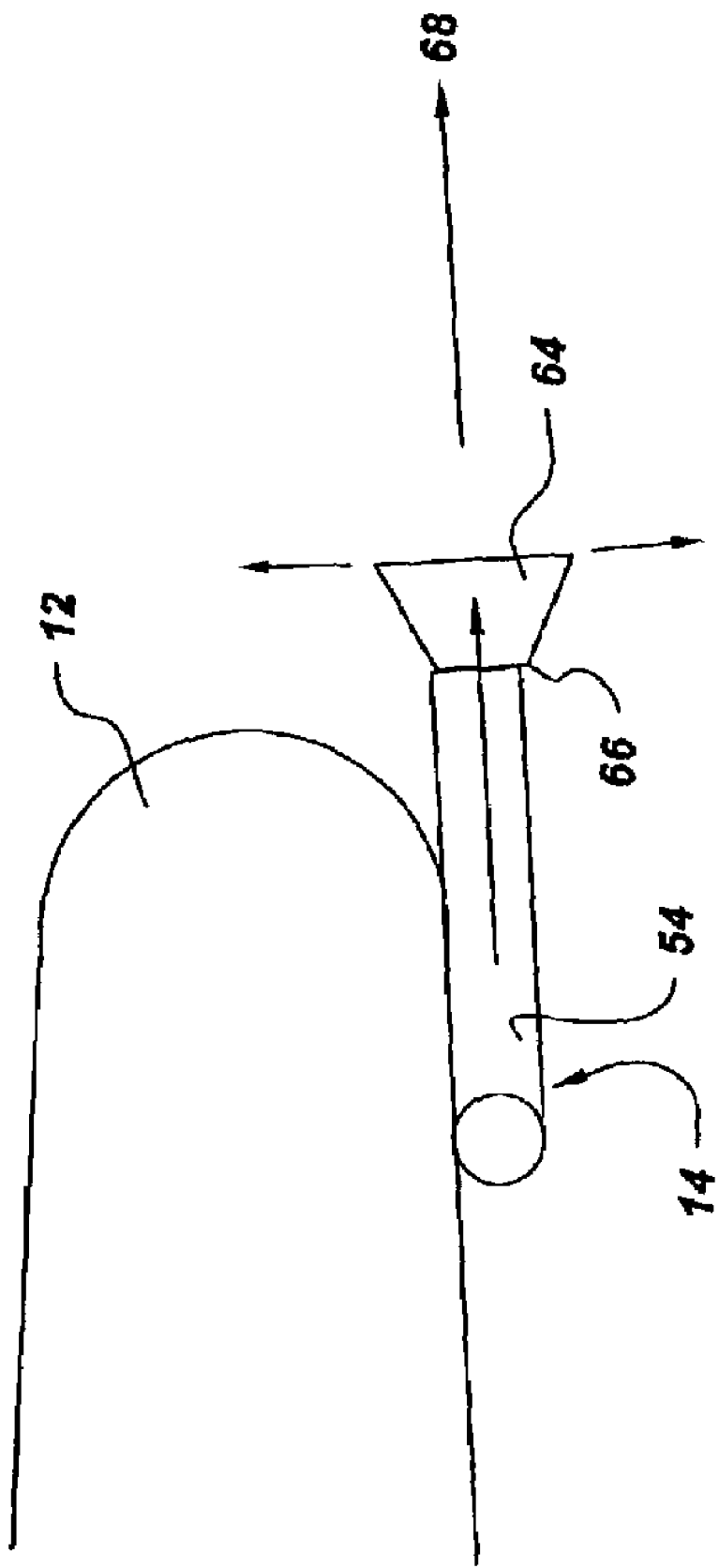
FIG. 12 shows one of the pulse detonation engine of FIG. 2 in side view equipped with a movably configured PDE flap for altering the direction of the thrust.

Another embodiment of aircraft 10 is described with reference to FIGS. 2 and 12. As shown in FIG. 2, for this embodiment the pulse detonation engines 14 are distributed along trailing edge 18 of airfoil 12, and at least one of the pulse detonation engines 14 includes a PDE flap 64. The PDE flap 64 is movably configured to alter the direction of the thrust force relative to airfoil 12. For the particular embodiment shown in FIG. 2, each of the pulse detonation engines 14 includes a PDE flap 64. FIG. 12 shows an exemplary PDE 14 with a movably configured flap 64. As noted above, the phrase "altering the direction" encompasses changing the direction of the thrust force horizontally, vertically, or both horizontally and vertically. For example, PDE flap 64 is attached to a main body 54 of PDE 14 by a flexible connector 66, as indicated in FIG. 12. For the embodiment of FIGS. 2, 12, and 13, PDE 14 is "movably configured to alter the direction of the thrust" via PDE flap 64. Exemplary PDE flaps 64 are conical (megaphone shaped), as indicated in FIG. 2, cylindrical or polygonal. Such PDE flaps 64 may be symmetric or asymmetric about axis 68. For the conical configuration shown in FIG. 12, exhaust gases from PDE main body 54 pass through both the flexible connector 66 and PDE flap 64.

Another embodiment of aircraft 10 is described with reference to FIGS. 5 and 6. For this embodiment, aircraft 10 further includes a number of rear pulse detonation engines 14 and at least one flap 22 attached to airfoil 12 along the trailing edge 18 of the airfoil. For the embodiment illustrated in FIG. 5, the airfoils 12 are aircraft wings 12. The rear pulse detonation engines 14 are distributed along the flap 22. Each rear pulse detonation engine 14 is adapted for impulsively detonating a fuel/oxidizer mixture to generate a thrust force and to apply the thrust force to the flap 22, and the flap 22 is movably configured to alter a direction of the thrust forces relative to the airfoil 12. For example, the flaps 22 are configured to move up and/or down, as indicated by the arrows in FIG. 6. As noted above, an exemplary oxidizer is air. By incorporating PDEs 14 below leading edge 16, as discussed above with respect to FIG. 2, and rear PDEs 14 distributed along flap 22, this aircraft embodiment provides additional thrust distribution and system redundancy, further enhancing maneuverability and reliability.

Figure 4:
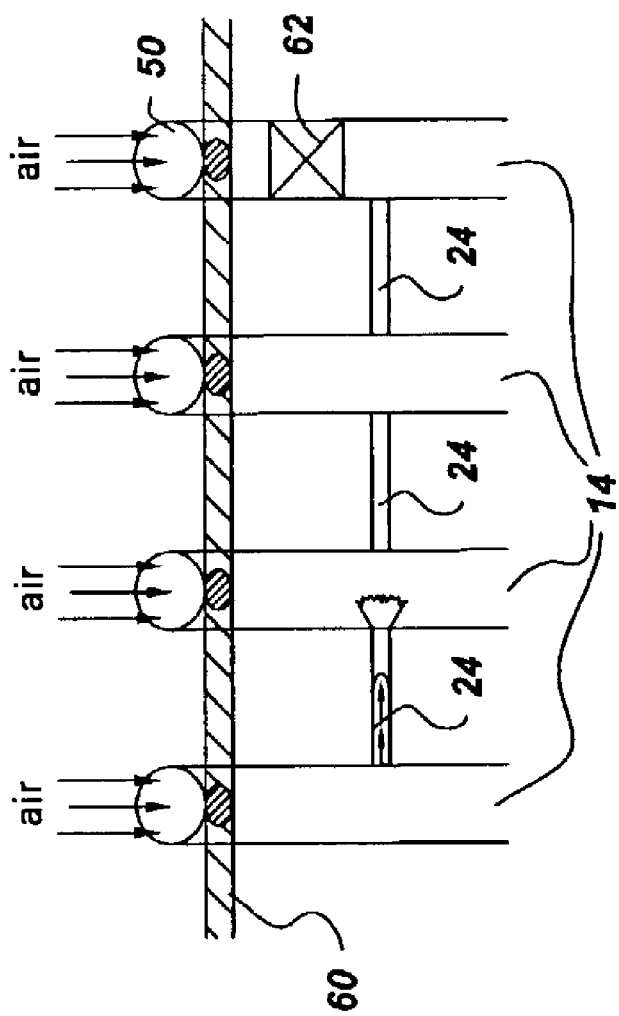
FIG. 4 shows an exemplary arrangement of a number of pulse detonation engines connected by a number of connectors for facilitating cross-fire initiation, with fuel supplied by a fuel manifold and mixed with air flowing through an inlet by an exemplary swirler.

In order to modulate thrust, according to a particular embodiment, at least two of the pulse detonation engines 14 are configured to impulsively detonate the fuel/oxidizer mixtures out of phase. As used here, the phrase "out of phase" means at different times. For example, a first PDE 14 detonates, while a second PDE 14 is in a filling mode, i.e., is receiving fuel and/or oxidizer. For the particular embodiment illustrated in FIG. 4, the PDEs 14 are detonated out of phase using a number of connectors 24. Each connector 24 is configured to connect two pulse detonation engines 14 to facilitate cross-fire initiation between the two PDEs, as indicated in FIG. 4. Exemplary connectors 24 comprise pipes 24 serving as conduits for the detonation from a first PDE 14 to a second PDE 14, shown here by arrows in connector 24. Although FIG. 4 shows the connectors 24 connecting each pair of neighboring PDEs 14, connectors 24 also could be configured to connect each PDE 14 to its neighbor once (or twice, etc.) removed, i.e., to connect every other PDE 14, to provide for non-sequential firing.

For an exemplary embodiment indicated in FIG. 4, fuel is supplied to the PDEs 14 by means of a fuel manifold 60. For the PDEs 12 distributed beneath airfoil 12, fuel manifold 60 is desirably situated within airfoil 12. For the rear PDEs 14 distributed along flap 22, the fuel manifold 60 is desirably situated either within airfoil 12, for example along the trailing edge 18 thereof, or within flap 22. To minimize manifolding of the oxidizer, the PDEs 14 and rear PDEs 14 for this exemplary embodiment are self-aspirating. More particularly, air flows through inlets 50, for the embodiment illustrated by FIG. 4. The PDEs and rear PDEs 14 may further include swirlers 62 for mixing the oxidizer and the fuel, as shown for example in FIG. 4. Beneficially, swirlers 62 are wall-like, in that they reflect the shock wave within PDEs 14.

In order to alter thrust distribution and engine power, the aircraft 10 according to a particular embodiment further includes a control means 20 for selectively activating and deactivating at least one of the pulse detonation engines 14. According to a more particular embodiment, the control means 20 is configured to selectively activate and deactivate each of the pulse detonation engines 14. It should be understood that the control means 20 could be used to activate and deactivate both the PDEs 14 distributed along the leading edge of the airfoil 12 and the rear PDEs 14 distributed along the flap 22 for the embodiments discussed above with respect to FIGS. 2 and 5. One exemplary control means 20 includes a separate source of ignition for each of the PDEs 14. Another exemplary control means 20 includes separate fuel valves (not shown) for each of the PDEs 14.

The use of a number of pulse detonation engines 14 to generate and control thrust for aircraft 10 provides numerous potential advantages over conventional gas turbine engines (not shown). As compared to gas turbine engines, the simpler design and superior thermodynamic efficiency of PDEs 14 presents an opportunity to create a more efficient, simpler aircraft engine, to distribute and scale the thrust and to provide system redundancy.

Figure 5:
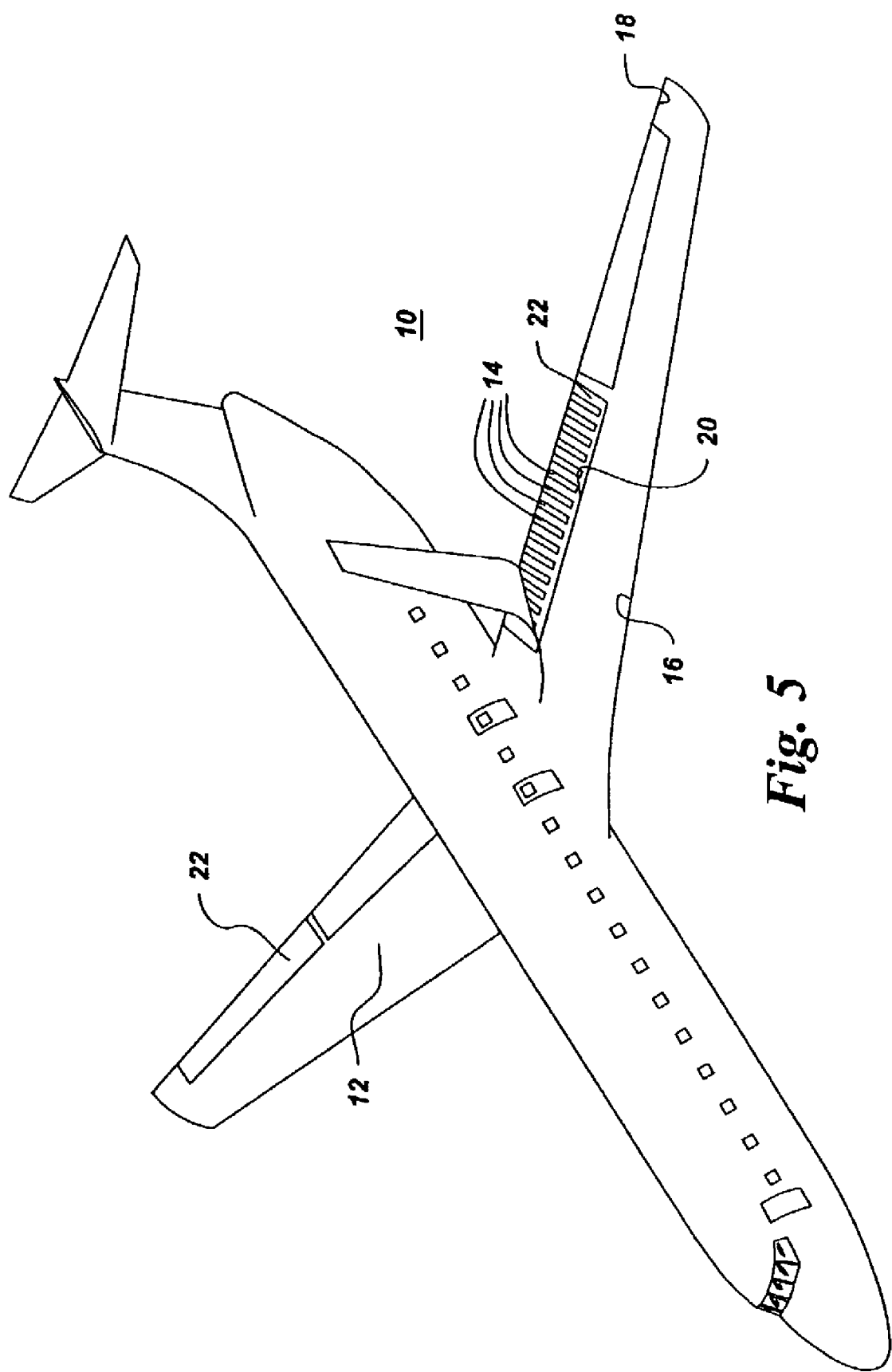
FIG. 5 illustrates another aircraft embodiment of the invention, the aircraft including a number of rear pulse detonation engines distributed along a flap attached to an airfoil along a trailing edge thereof.
Figure 6:
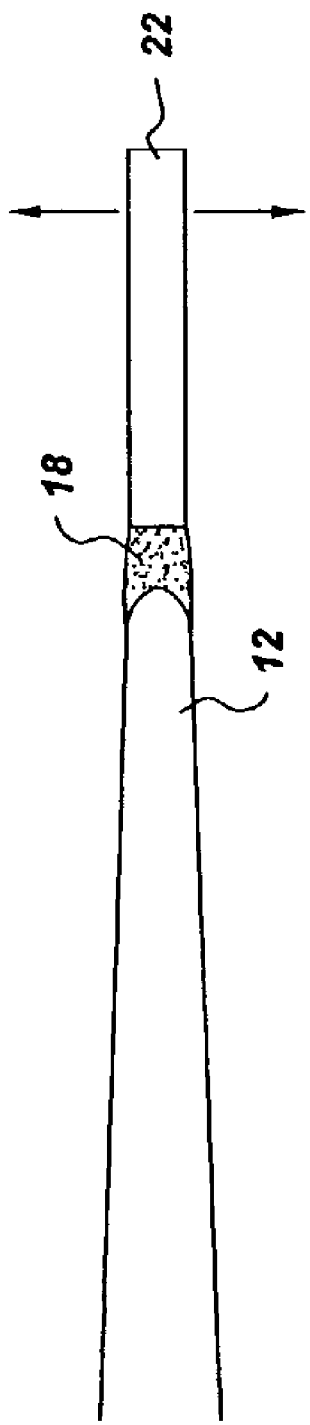
FIG. 6 is a cross-sectional view of an airfoil and flap of the aircraft of FIG. 5.

For the embodiments illustrated by FIGS. 1, 2 and 5 the aircraft 10 includes at least two airfoils (wings) 12, each airfoil having a leading edge 16 and a trailing edge 18. Pulse detonation engines 14 are distributed along one of the leading and trailing edges 16, 18 of each of the airfoils 12 and are positioned below each of the respective airfoils 12. For the particular embodiment shown in FIG. 2, PDEs 14 are distributed along the trailing edges 18 of the airfoils 12, and at least one of the PDEs 14 includes a PDE flap 64, as discussed above with respect to FIG. 2. To enhance maneuverability and control, according to a more particular embodiment, the aircraft 10 further includes control means 20 for selectively activating and deactivating at least one of the PDEs 14 on each of the airfoils 12.

Similarly, for the embodiment shown in FIG. 5, the PDEs 14 are distributed along the leading edge 16 of each of the airfoils 12, and the aircraft 10 further includes at least two flaps 22, each of the flaps being attached to a respective one of the airfoils 12 along the trailing edge 18 of the respective airfoil 12. Each of the flaps 22 is movably configured to alter a direction of the thrust forces relative to the respective one of the airfoils 12, and the rear pulse detonation engines 14 are distributed along the flaps 22. To enhance maneuverability and control, according to a more particular embodiment, the aircraft 10 further includes control means 20 for selectively activating and deactivating at least one of the pulse detonation engines 14 on each of the airfoils 12, and each of the PDEs 14 is movably configured for altering a direction of the thrust force relative to the respective one of the airfoils 12. According to a particular embodiment, rear PDEs are fixedly attached to flaps 22, for examples rear PDEs 14 are embedded within flaps 22, and hence are not movably configured relative to flaps 22.

Figure 7:
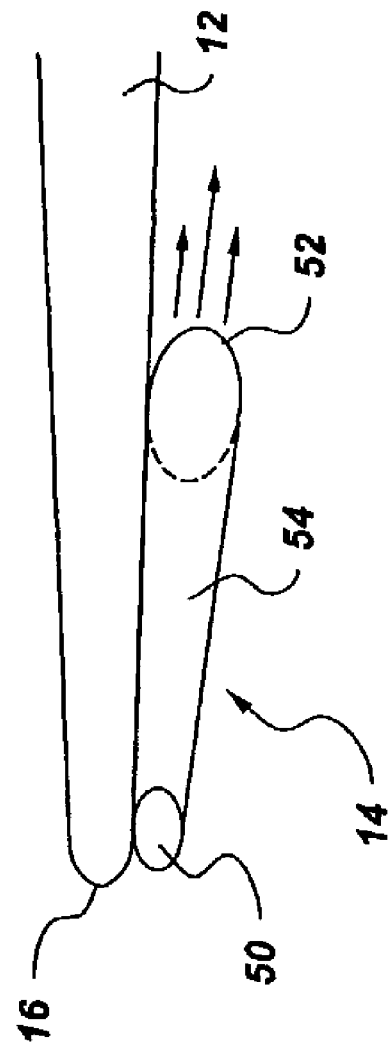
FIG. 7 shows a pulse detonation engine (PDE) positioned beneath an airfoil, the PDE having a larger cross-sectional area near the outlet of the PDE than at the inlet of the PDE.
Figure 8:
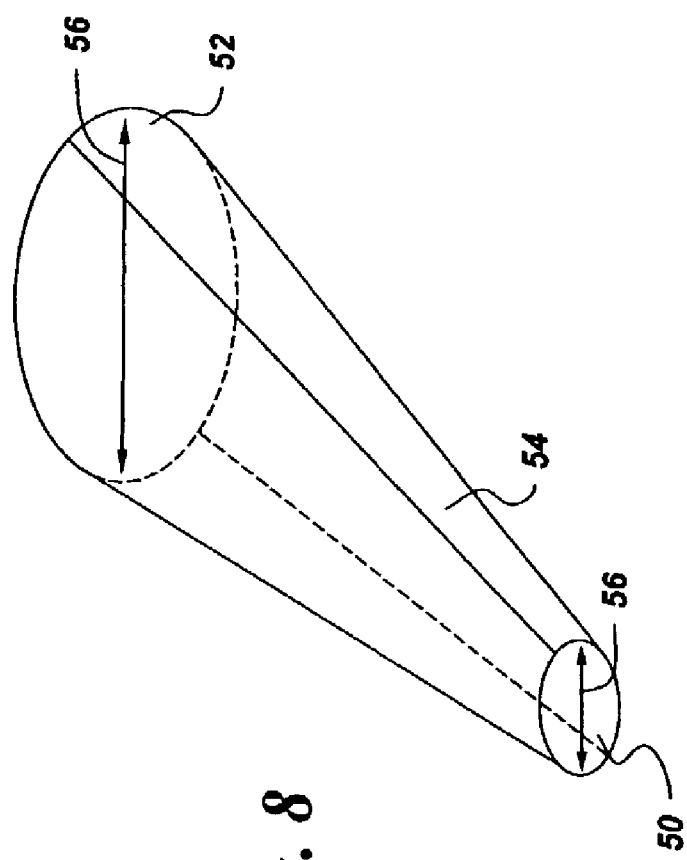
FIG. 8 shows an exemplary pulse detonation engine with an elliptical inlet and outlet and with a varying cross-sectional area.

FIG. 7 shows one exemplary PDE 14 attached beneath a leading edge 16 of an airfoil 12. As shown, each of the pulse detonation engines 14 has an inlet 50 for receiving oxidizer, an outlet 52 for exhausting an exhaust flow, and a PDE body 54 extending between the inlet and 50 the outlet 52. For the particular embodiment illustrated in FIGS. 7 and 8, the PDE body 54 has a cross-sectional area that increases from a smaller cross-sectional area at inlet 50 to a larger cross-sectional area at outlet 52. This variable cross-sectional area has aerodynamic benefits. However, PDEs 14 with other cross-sectional areas, for example conventional cylindrical PDEs 14, may also be used. On the other hand, at high altitudes, the low ambient pressure increases detonation cell size. Accordingly, for high altitude applications, it is desirable to restrict the size of outlet 52 to increase the pressure within PDE body 54. Accordingly, for another embodiment (not shown), the PDE body 54 has a cross-sectional area that decreases from a larger cross-sectional area at inlet 50 to a smaller cross-sectional area at outlet 52. According to a more particular embodiment, the outlet 52 is configured to vary its flow-through area depending on the application, for example based on altitude. This variable flow-through area for outlet 52 may be controlled for example by flap 64. FIG. 8 shows a more particular embodiment of PDE 14, in which at least one of, and more particularly, both the inlet 50 and the outlet 52 have an elliptical cross-sectional area with a semi-major axis 56 oriented along the airfoil 12. The elliptically shaped PDEs 14 of FIG. 8 further enhance the aerodynamics of aircraft 10.

Figure 9:
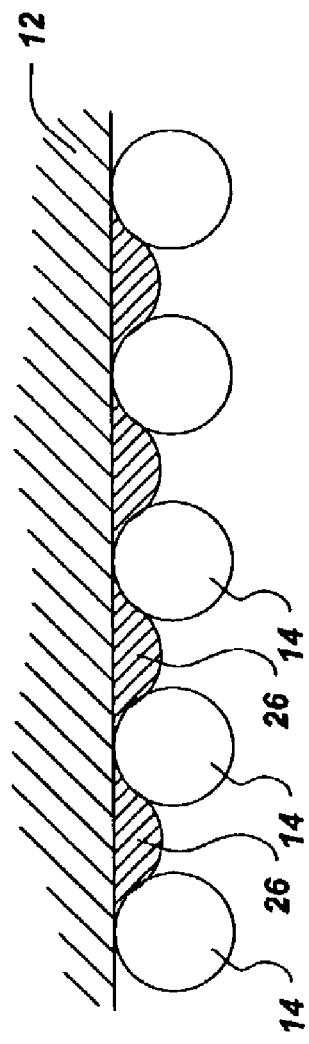
FIG. 9 shows a number of pulse detonation engines positioned underneath an airfoil and separated by a number of separators.

In order to further improve the aerodynamics of aircraft 10, according to the particular embodiment depicted in FIG. 9, the aircraft 10 further includes a number of separators 26 extending from and beneath the airfoil 12. As shown, each of the separators 26 is in intimate contact with at least one of the pulse detonation engines 14. Further, at least one of the separators 26 is in intimate contact with two of the pulse detonation engines 14. As use here, the phrase "extending from airfoil 12" encompasses separators 26 that are integral to the airfoil 12 and separators 26 that are attached to the airfoil 12, for example by rivets (not shown). It should be noted that although the PDEs 14 are shown in FIG. 9 as being circular in cross-section, the PDEs 14 may have other cross-sections, such as the elliptical configurations discussed above with respect to FIG. 8.

Another aircraft 10 embodiment of the invention is also described with reference to FIG. 2. For this embodiment, the aircraft 10 includes at least one airfoil 12 having a leading edge 16 and a trailing edge 18 and a number of pulse detonation engines 14 distributed along the trailing edge 18 of the airfoil 12 and positioned beneath the airfoil 12. Each PDE 14 is adapted for impulsively detonating a fuel/oxidizer mixture to generate a thrust force and to apply the thrust force to the aircraft 10. As indicated in FIG. 2, at least one of the pulse detonation engines 14 includes a PDE flap 64, which is movably configured to alter the direction of the thrust force relative to airfoil 12. More particular aspects of this embodiment include: (1) each pulse detonation engine 14 including a PDE flap 64, (2) at least two of pulse detonation engines 14 being configured to impulsively detonate the fuel/oxidizer mixtures out of phase, (3) facilitating cross-fire initiation between two PDEs 14 using connectors 24, and (4) selectively activating and deactivating at least one of the PDEs 14, using control means 24. These aspects are discussed in detail above. In another more particular embodiment, the aircraft 10 includes at least two airfoils 12, the pulse detonation engines 14 being distributed along the trailing edges 18 of and beneath the airfoils 12.

Figure 10:
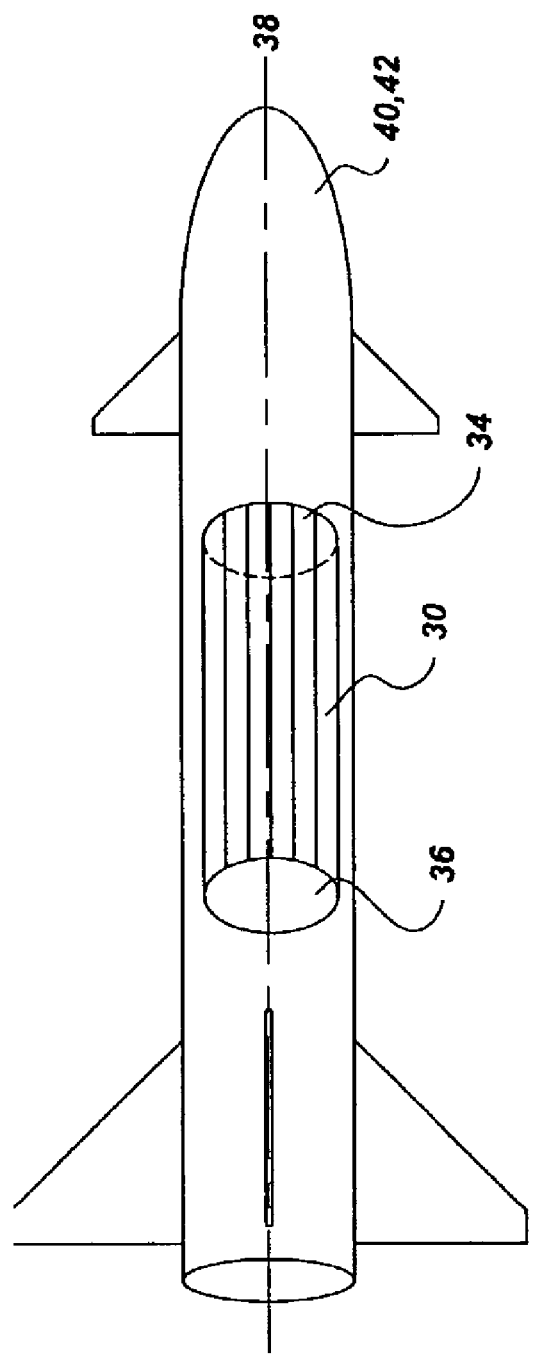
FIG. 10 illustrates a detonative engine embodiment of the invention for use in a rocket or missile.
Figure 11:
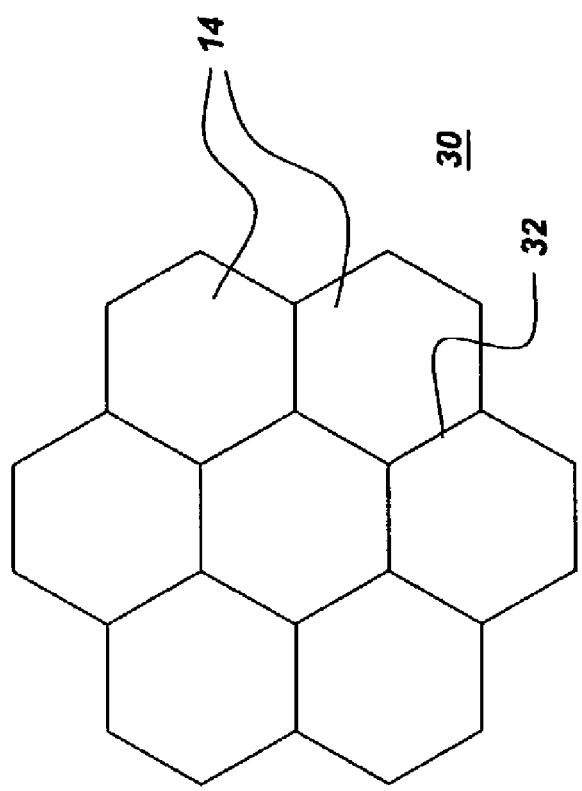
FIG. 11 shows a packed configuration of pulse detonation engines packed in a honeycomb arrangement.

A detonative engine 30 embodiment of the invention is described with reference to FIGS. 10 and 11. As shown, detonative engine 30 includes a number of pulse detonation engines 14 arranged in a packed configuration. As used here, the phrase "packed configuration" means that each of the PDEs 14 contacts its neighboring PDEs 14 along a side 32, as shown for example in FIG. 11. Beneficially, arranging pulse detonation engines 14 in a packed configuration reduces the volume occupied by the detonative engine 30. For the particular arrangement illustrated in FIG. 11, at least one of the pulse detonation engines 14 is hexagonal, and the pulse detonation engines 14 are packed in a honeycomb arrangement. Although the hexagonal PDEs 14 shown in FIG. 10 have straight sides 32, the sides may also be curved. Beneficially, the honeycomb arrangement shown in FIG. 11 further reduces the space occupied by detonative engine 30. For the particular embodiment illustrated in FIG. 10, the pulse detonation engines 14 share an inlet 34 and an outlet 36. For exemplary applications of detonative engine 30, the pulse detonation engines 14 extend along an axis 38 of a rocket 40 or along an axis 38 of a missile 42.

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An aircraft comprising:
    at least one airfoil having a leading edge and a trailing edge; and
    a plurality of pulse detonation engines (PDE) distributed along one of said leading and trailing edges of said airfoil and positioned beneath said airfoil, each pulse detonation engine being adapted for impulsively detonating a fuel/oxidizer mixture to generate a thrust force and to apply the thrust force to said aircraft,
    wherein at least one of said pulse detonation engines is movably configured for altering a direction of the thrust force relative to said airfoil, and
    wherein at least two of said pulse detonation engines are configured to impulsively detonate the fuel/oxidizer mixtures out of phase.

2. The aircraft of claim 1, further comprising a plurality of connectors, each of said connectors being configured to connect two of said pulse detonation engines to facilitate cross-fire initiation between said two pulse detonation engines.

3. The aircraft of claim 1, further comprising a control means for selectively activating and deactivating at least one of said pulse detonation engines.

4. The aircraft of claim 3, wherein said control means is configured for selectively activating and deactivating each of said pulse detonation engines.

5. The aircraft of claim 1, comprising at least two airfoils, each airfoil having a leading edge and a trailing edge, wherein said pulse detonation engines are distributed along one of said leading and trailing edges of each of said airfoils and are positioned below each of said airfoils.

6. The aircraft of claim 5, wherein said pulse detonation engines are distributed along said trailing edges of said airfoils, and wherein at least one of said pulse detonation engines comprises a PDE flap, said PDE flap being movably configured to alter the direction of the thrust force relative to said respective airfoil.

7. The aircraft of claim 6, further comprising a control means for selectively activating and deactivating at least one of said pulse detonation engines on each of said airfoils.

8. The aircraft of claim 5, wherein said pulse detonation engines are distributed along said leading edge of each of said airfoils.

9. The aircraft of claim 8, further comprising:
a plurality of rear pulse detonation engines; and
at least two flaps, each of said flaps being attached to a respective one of said airfoils along said trailing edge of the respective one of said airfoils,
wherein each of said flaps is movably configured to alter a direction of the thrust forces relative to the respective one of said airfoils, and wherein said rear pulse detonation engines are distributed along said flaps.

10. The aircraft of claim 8, further comprising a control means for selectively activating and deactivating at least one of said pulse detonation engines on each of said airfoils,
wherein each of said pulse detonation engines is movably configured for altering a direction of the thrust force relative to the respective one of said airfoils.

11. An aircraft comprising:
at least one airfoil having a leading edge and a trailing edge; and
a plurality of pulse detonation engines (PDE) distributed along one of said leading and trailing edges of said airfoil and positioned beneath said airfoil, each pulse detonation engine being adapted for impulsively detonating a fuel/oxidizer mixture to generate a thrust force and to apply the thrust force to said aircraft,
wherein at least one of said pulse detonation engines is movably configured for altering a direction of the thrust force relative to said airfoil, wherein each of said pulse detonation engines comprises an inlet for receiving oxidizer, an outlet for exhausting an exhaust flow, and a PDE body extending between said inlet and said outlet, wherein at least one of said inlet and said outlet has an elliptical cross-sectional area with a semi-major axis oriented along said airfoil, and wherein the semi-major axis is greater than a semi-minor axis of said outlet.

12. The aircraft of claim 11, wherein said PDE body has a cross-sectional area that increases from a smaller cross-sectional area at said inlet to a larger cross-sectional area at said outlet.

13. The aircraft of claim 11, wherein each of said inlet and said outlet have an elliptical cross-sectional area with the semi-major axis oriented along said airfoil, and wherein the semi-major axis of said inlet is greater than a semi-minor axis of said inlet.

14. The aircraft of claim 1, wherein each of said pulse detonation engines comprises an inlet for receiving oxidizer, an outlet for exhausting an exhaust flow, and a PDE body extending between said inlet and said outlet, wherein said PDE body has a cross-sectional area that decreases from a larger cross-sectional area at said inlet to a smaller cross-sectional area at said outlet.

15. The aircraft of claim 1, further comprising a plurality of separators extending from said airfoil and beneath said airfoil, each of said separators being in intimate contact with at least one of said pulse detonation engines, and at least one of said separators being in intimate contact with two of said pulse detonation engines.

* * * * *